Feb. 7, 1956 P. L. HARDING 2,733,540
FISHHOOK
Filed Dec. 29, 1952
Fig. 1
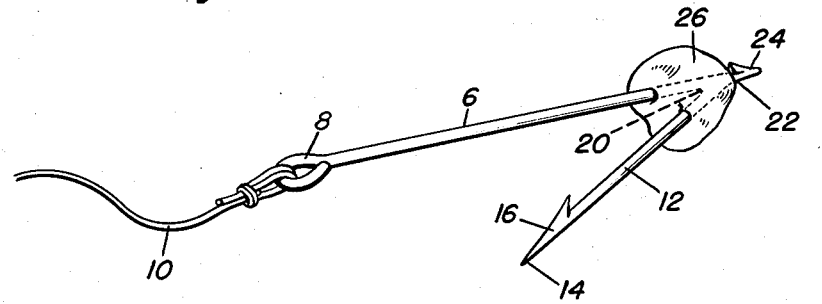
Fig. 2
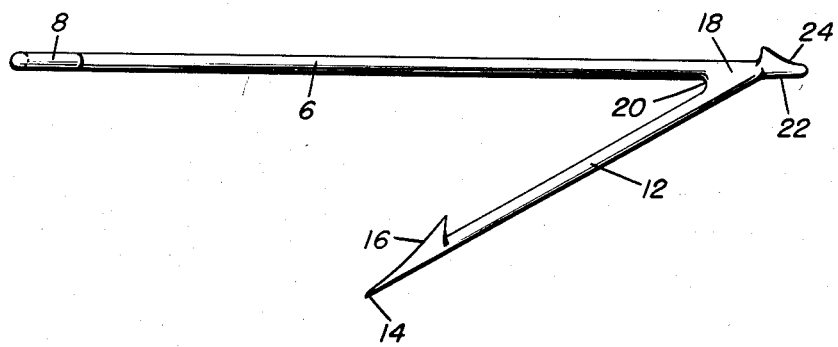
Fig. 3
Fig. 4
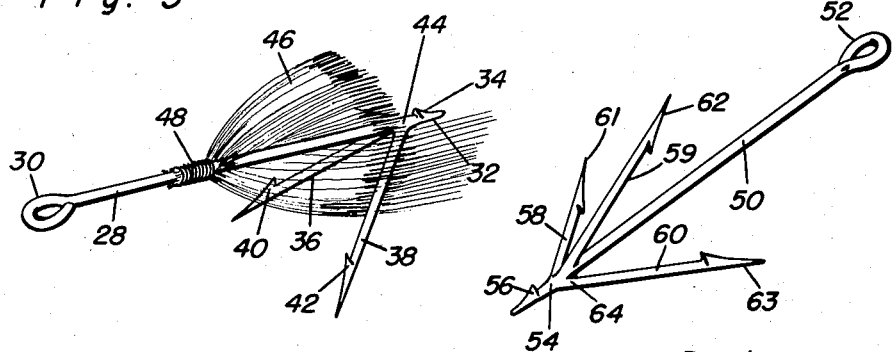
Paul L. Harding
INVENTOR.
BY *Clarence A. O'Brien*
*and Harvey B. Jacobson*
Attorneys United States Patent Office 2,733,540
Patented Feb. 7, 1956

2,733,540
FISHHOOK
Paul L. Harding, St. Louis, Mo.
Application December 29, 1952, Serial No. 328,385
1 Claim. (Cl. 43—44.82)

The present invention relates to improvements in a fishhook, one which is effectively designed with a view toward appreciably increasing the usefulness of the hook and with the likelihood that desirable results may be expected from its adoption and use.

It is realized that fishhooks have and are being made with single, double and treble prongs with the idea that the one instrumentality with more than one prong increases the chances of landing more fish. It is here an object of the present endeavor to structurally, functionally and otherwise improve upon multiple pronged hooks and to thus provide an improved article of manufacture in which anglers will find their expected needs more satisfactorily met.

The invention relates to a fishhook characterized by a shank having a line attaching eye at one end and at least one prong at the opposite end, wherein the axis of the prong is at an oblique angle to the longitudinal axis of the shank, the free end of the prong extending toward and being pointed in the direction of the eye and having a barb-equipped terminal.

More specifically the invention relates to a structural adaptation as generally set forth above in combination with two or more similar barb-equipped prongs all converging at a junctural place inwardly or forwardly of a bait attaching extension, and wherein one prong is substantially coplanar with the shank, and the other prongs branch sidewise to thus position themselves in a range of activity and increasing the catching possibilities to an appreciable extent.

Other objects, features and advantages will become more readily apparent from the following description and the accompanying drawings.

In the drawings:

Figure 1 is a perspective view of a single prong fishhook;

Figure 2 is an enlarged side elevation of the single prong fishhook shown in Figure 1;

Figure 3 is a perspective view of the double prong fishhook construction, a modification, and with hackle attached to the shank; and Figure 4 is a perspective view of a triple prong fishhook construction, a further modification.

Attention is first directed to the form of the invention appearing in Figures 1 and 2. With particular reference to Figure 2, the over-all fishhook is obviously a one-piece structural adaptation of suitable material, rigidity and weight. The size will depend largely upon the kind or species of fishes which are being fished for. That is to say, a fishhook having the characteristics revealed lends itself to construction in all sizes, ranging from tiny or small hooks for flies to large ones for ocean fishing, trolling, etc.

The aforementioned shank 6 is rigid and linearly straight and is provided at its forward or leading end with a suitable eye 8 to accommodate the fishing line or leader 10. The single prong has a shank portion which is linearly straight as is denoted at 12, and this is at an oblique angle in respect to the shank 6. The prong may be at any degree of obliquity to the shank and is usually around about 30–45°. In any event, the leading or forward end is preferably pointed and is needle sharp, as at 14, and a suitable barb 16 is provided. This end 14 is directed toward the eye 12. The prong joins the shank and provides a rather sturdy and reliable connection at 18. It also defines a V-shaped crotch 20 at this point, and it is important to note that the adjacent end of the shank 6 extends beyond the junctional joint 18 where it is reduced in cross-section to provide a stubby extension serving as a bait holder 22. This holder is preferably blunt. In most instances, however, it will be provided with a barb 24 beyond the joint 18. The portions 22 and 24 provide an ideal means for attachment and satisfactory retention of either live or artificial bait. That is to say, 22 and 24 may accommodate a worm, or there may be a wad of dough or a so-called dough ball 26 provided, and this may be slipped over the joint 18 for advantageous and efficacious use. In this form of the invention, the prong 12 will be in approximately the same plane as the shank 6. That is to say, looking downwardly on the shank 6, we find the prong 12 directly therebeneath. Even where a single prong is used, the free end portion could be bent laterally to one side in order to extend in what would be called a sidewise direction.

With reference to the form of the invention in Figure 3, the shank is denoted at 28, the eye at 30, the bait holder at 32, and the barb at 34. Here, there are two prongs, and they are denoted by the numerals 36 and 38, and they have barb-equipped forward or leading end portions 40 and 42 performing as already described. In this form of the invention, the prongs converge towards each other in a rearward direction and they join with the shank at the junctural portion 44 which is, of course, forwardly or inwardly of the bait holding means 32 and 34. Structurally, the double pronged fishhook is basically the same as that already described and shown best in Figures 1 and 2.

If desired a tail made of hackle or other similar flimsy strands 46 may be employed. This is fastened on the intermediate portion of the shank by suitable wrappings, as at 48.

The same fundamental ideas are shown in the modification seen in Figure 4 wherein the shank is denoted at 50, the eye at 52, the bait holding extension at 54, and the associated barb at 56. Here, there are several prongs denoted by the numerals 58, 59 and 60. They have pointed barb-equipped free ends 61, 62 and 63, respectively. The junctural portions diverge and connect with the shank and provide a joint as denoted at 64.

Since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A fishhook comprising a rigid linearly straight shank having a fishing line attaching eye at one end and having a relatively short stubby extension at the other end, said extension tapering and being reduced in cross-section in a direction toward its outer terminal end and being provided on one side with a complemental barb, said extension being straight and in axial alignment with said shank, and at least one longitudinally elongated linearly straight prong of a length less than that of said shank and having a pointed barb-equipped free forward end and a rearward end integrated with said shank inwardly and forwardly of said first named barb and at its point of junctural connection with said extension, the axis of said prong being oblique to the axis of said shank and said prong branching outwardly relative to said shank defining a substantially V-shaped crotch between the complemental integrated portions of the prong and shank respectively.

References Cited in the file of this patent

UNITED STATES PATENTS

| | | |
|---|---|---|
| 211,777 | Pierce | Jan. 28, 1879 |
| 666,309 | Fiege | Jan. 22, 1901 |
| 954,352 | Sjolander | Apr. 5, 1910 |
| 1,249,342 | Dahl | Dec. 11, 1917 |
| 1,533,092 | Bonbright | Apr. 14, 1925 |
| 2,241,152 | Moats | May 6, 1941 |
| 2,591,764 | Allen | Apr. 8, 1952 |

FOREIGN PATENTS

| | | |
|---|---|---|
| 1,443 | Great Britain | 1884 |
| 19,519 | Great Britain | Sept. 1, 1906 |